June 9, 1931.  E. O. HAMREN  1,808,891
PIKE POLE GUARD
Filed Oct. 2, 1929
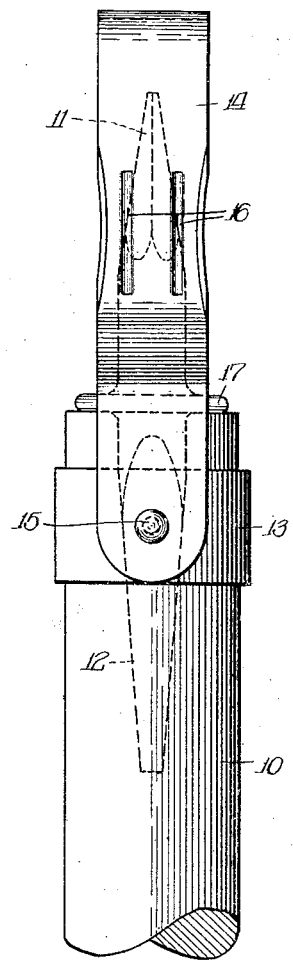
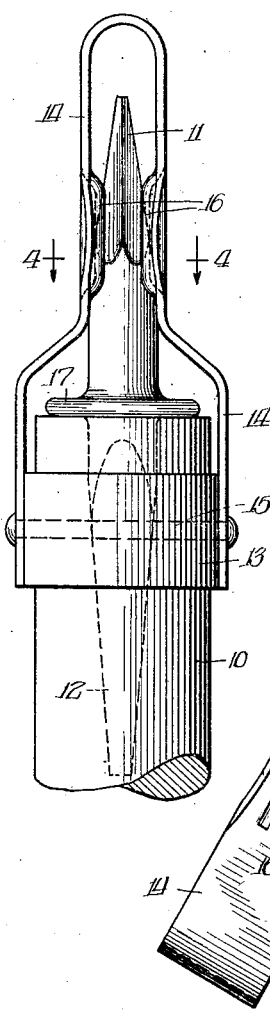
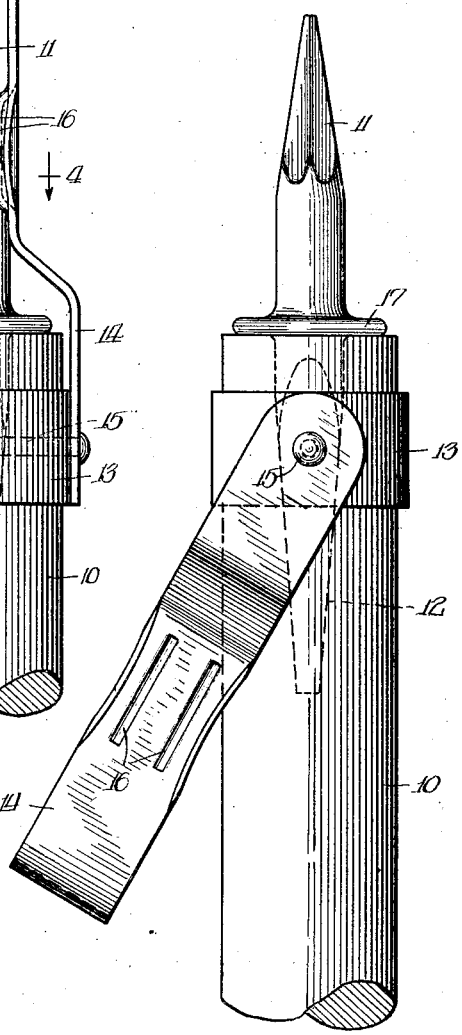
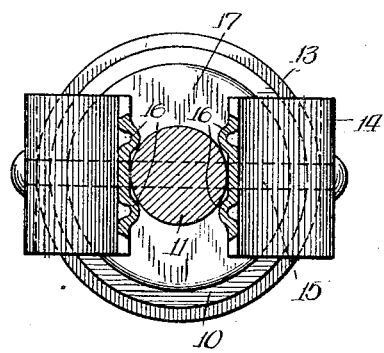
Inventor:
Eric O. Hamren, Patented June 9, 1931

1,808,891

UNITED STATES PATENT OFFICE

ERIC O. HAMREN, OF OSHKOSH, WISCONSIN, ASSIGNOR TO LEACH COMPANY, OF OSHKOSH, WISCONSIN, A CORPORATION OF WISCONSIN

PIKE POLE GUARD

Application filed October 2, 1929. Serial No. 396,704.

In line construction work, the pike poles used are the cause of frequent and sometimes very serious injuries to the workmen, not so much while the pike poles are actually being used, but before and after use, while they are lying around or are being transported.

The object of the present invention is to provide a novel pike pole guard which gives adequate protection, which may be easily and quickly moved into a protecting position, which assumes an out-of-way position on the pole while the latter is being used, which does not add appreciably to the weight of the pole, and which is inexpensive to manufacture and apply.

While the foregoing statements are indicative in a general way of the nature of the invention, other objects and advantages will be apparent upon a full understanding of the construction, arrangement and operation of the novel guard device.

One form of the invention is presented herein for the purpose of exemplification, but it will of course be appreciated that the invention is susceptible of embodiment in other structurally modified forms coming equally within the contemplated scope of the appended claims.

In the accompanying drawings:

Fig. 1 is a side view of the head of a pike pole; showing the guard of the invention in its operative or protecting position;

Fig. 2 is a different side view of the same;

Fig. 3 is a side view corresponding to Fig. 1, showing the guard in its inoperative or swung-back position; and Fig. 4 is a transverse section, taken on the line 4—4 of Fig. 2.

The assembly shown in the drawings consists of a pole 10, a pike 11 which has an anchoring portion 12 embedded within the pole, a collar 13 which fits about the end of the pole, a U-shaped strap 14 which is arranged with the ends thereof at opposite sides of the collar, and a headed pin 15, which extends through the ends of the strap, the collar, the end of the pole and the anchoring portion of the pike, whereby to hold the assembly together and provide a pivotal mounting for the strap.

The strap 14 may be easily and quickly swung from the operative protecting position shown in Fig. 1 to the inoperative out-of-way position shown in Fig. 3, and vice versa. The side portions of the strap, between the bend and the pivoted ends, are spaced apart only far enough to permit the strap to be swung forwardly into alignment with the pike, and have positioning indentations 16 formed therein for resiliently yieldable engagement with the sides of the pike, as clearly shown in Fig. 4.

When the strap 14 is swung forwardly into the position shown in Fig. 1, the sharp pointed tip of the pike is shielded and cannot cause any damage or injury. When the strap is swung backwardly into the position shown in Fig. 3, the pike is exposed and can be used just as effectively as if the guard were not there.

The pike, it will be observed, is provided, intermediate its projecting and embedded ends, with a disk-like portion 17 which abuts with the end of the pole and is substantially coextensive therewith.

I claim:

1. The combination, with a pole, and a pike at one end of the same, of a guard removably associated with the pike, said guard being pivotally mounted on the pole whereby to permit it to be swung forwardly from either side of the pole into a protecting position with respect to the tip of the pike or backwardly into an unobstructive position at either side of the pole.

2. The combination, with a pole, and a pike at one end of the same, of a generally U-shaped strap which resiliently embraces the pike and is pivoted at its ends to opposite sides of the pole.

3. The combination, with a pole, and a projecting pike having an anchoring portion embedded in one end of the pole, of a collar on the end of the pole, a U-shaped pike-protecting strap arranged with the ends thereof at opposite sides of the collar, and a pin extending through the ends of the strap, the collar, the end of the pole and the anchoring portion of the pike for holding the assembly together and forming a pivotal mounting for the strap.

4. The combination, with a pole, and a pointed pike at one end of the same, of a guard removably associated with the pike for shielding the tip of the latter, said guard in its protective position being spaced axially from the tip of the pike.

5. The combination, with a pole, and a pointed pike at one end of the same, of a guard removably associated with the pike for shielding the tip of the latter, and spring means associated with the guard for holding the latter against inadvertent movement when in its protective position.

6. The combination, with a pole, and a pointed pike at one end of the same, of a guard removably associated with the pike in spaced relation to the tip of the latter for shielding such tip, and means associated with the guard at a point inwardly of the pike with respect to the tip for holding the guard against inadvertent movement when in its protective position.

In witness whereof I have hereunto subscribed my name.

ERIC O. HAMREN.